United States Patent [19]

Hunter et al.

[11] Patent Number: 5,004,654
[45] Date of Patent: Apr. 2, 1991

[54] ALUMINIUM BATTERIES

[75] Inventors: John A. Hunter, Banbury; Geoffrey M. Scamans, Cropredy, both of England; Wilfred B. O'Callaghan; Paul A. Wycliffe, both of Kingston, Canada

[73] Assignee: Alcan International Limited, Montreal, Canada

[21] Appl. No.: 389,619

[22] Filed: Aug. 4, 1989

[30] Foreign Application Priority Data

Aug. 9, 1988 [GB] United Kingdom ............. 8818857
Mar. 23, 1989 [GB] United Kingdom ............. 8906777

[51] Int. Cl.$^5$ .................. H01M 4/24; H01M 4/46
[52] U.S. Cl. ........................ 429/50; 429/206; 429/218
[58] Field of Search ................ 429/50, 206, 218

[56] References Cited

U.S. PATENT DOCUMENTS

| | | | |
|---|---|---|---|
| 4,078,946 | 3/1978 | Anthony et al. | 148/2 |
| 4,084,963 | 4/1978 | Anthony et al. | 420/541 X |
| 4,146,678 | 3/1979 | Anthony et al. | 429/50 |
| 4,751,086 | 6/1988 | Jeffrey et al. | 429/218 |

Primary Examiner—Stephen J. Kalafut
Attorney, Agent, or Firm—Cooper & Dunham

[57] ABSTRACT

An aluminum battery comprises an aqueous alkaline electrolyte and an anode which is an alloy of aluminum containing magnesium and/or calcium. Tin is present in the electrolyte (as stannate at a concentration of 0.001 to 0.01 M) and/or in the anode (at a concentration of at least 0.005%). The batteries operate at high coulombic efficiency at both high and low current densities. Preferred conditions of operation comprise drawing current at an average current density of 5 to 400 mA/cm$^2$ of anode surface for at least one hour, and introducing seed crystals into the electrolyte to aid precipitation of aluminum values from the electrolyte.

10 Claims, 1 Drawing Sheet

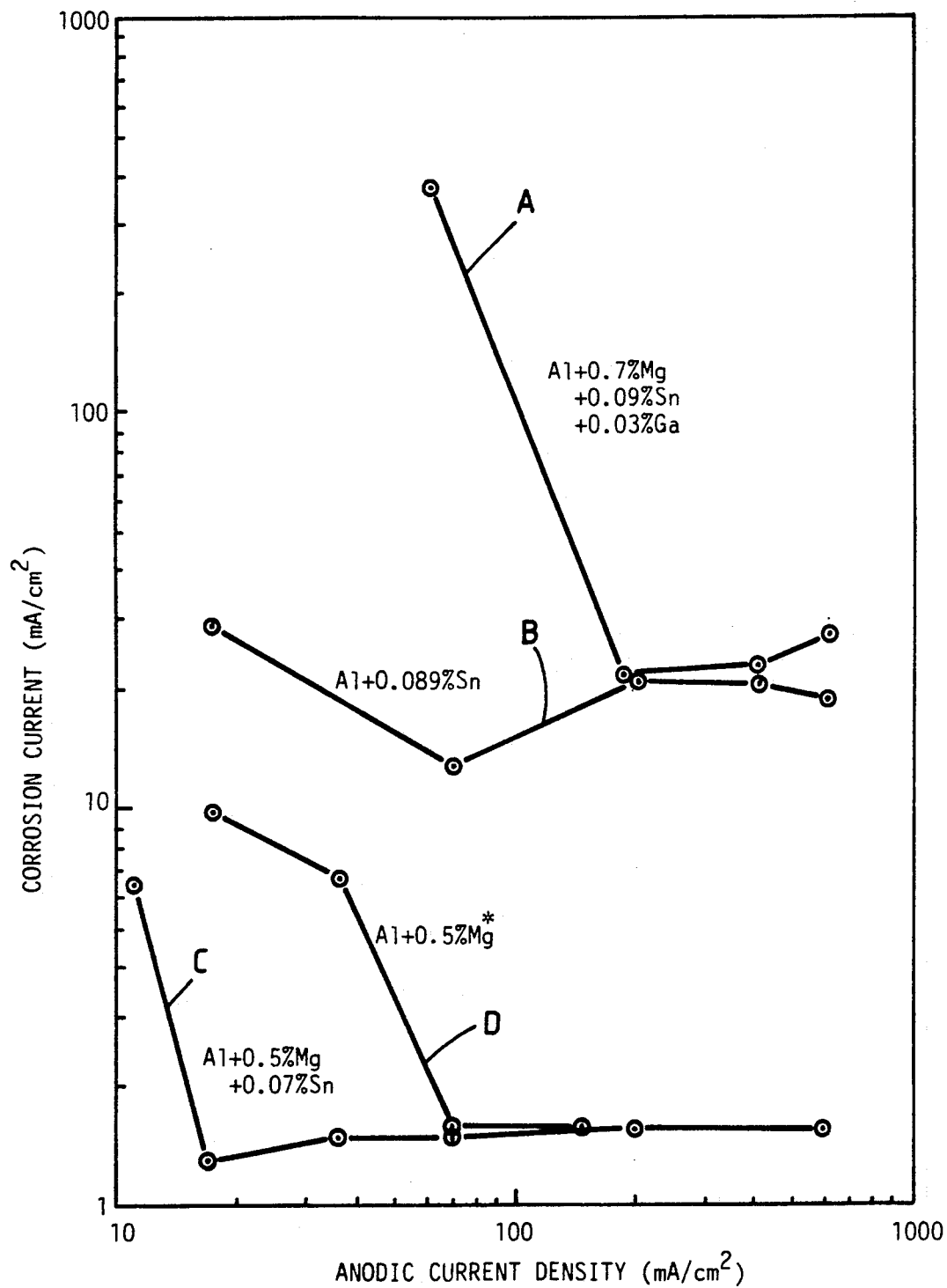

ALUMINIUM BATTERIES

This invention relates to aluminum batteries, and particularly though not exclusively to aluminum/air batteries. These have an air cathode and an aluminum anode, and the net chemical reaction occurring is $$4Al + 6H_2O + 3O_2 \rightarrow 4Al(OH)_3$$

The invention also applies to aluminum battery systems where the oxygen is provided by an oxidizing agent such as $MnO_2$ or $H_2O_2$ and to aluminum/silver oxide batteries (as in U.S. Pat. No. 3,953,239) in which the overall cell reaction is $$Al + 3/2 AgO + 3/2 H_2O \rightarrow Al(OH)_3 + 3/2 Ag$$

The primary battery system, which may be used with either a neutral chloride or alkaline electrolyte may be recharged mechanically by refuelling the battery with further aluminum. This refuelling takes place in minutes, rather than the hours required to recharge a secondary battery.

Batteries with alkaline electrolytes have greatly superior performance to those with neutral chloride electrolytes. The alkaline system provides both high specific energy (e.g. 400 Wh/kg) and power density (e.g. 175 W/kg), where the comparable figures for neutral chloride systems are 220 Wh/kg and 30 W/kg. Both systems have an infinite shelf life provided that the electrolyte is stored separate from the anode. This invention is concerned with aluminum battery systems having alkaline electrolytes.

Katoh U.S. Pat. No. 3,563,803 is concerned with batteries of this kind and teaches the addition to the alkaline electrolyte of sodium stannate, preferably at a concentration of between 0.05 and 0.1M. Anode composition is not discussed.

Moden U.S. Pat. Nos. 4,107,406 and 4,150,204 teaches the use in such batteries of anodes consisting of aluminum alloys with gallium, magnesium and optionally tin. Gallium at 0.001 to 0.072% is an essential component of the anode. In the examples, the electrolyte contained 20 g/l of sodium stannate.

Pryor U.S. Pat. Nos. 3,186,836 and 3,189,486 describes batteries using Al/Sn anodes optionally containing Mg, in neutral sodium chloride electrolytes.

Bohnstedt GB No. 2020478 describes the addition, in batteries of the alkaline kind, of gallium, indium or thallium to the alkaline electrolyte. The anode may be an aluminum-magnesium alloy. The electrolyte may contain standard performance additives, for example sodium stannate at a concentration of about 20 g/l (0.07M).

Jeffrey EPA No. 209402 is concerned to avoid the problems resulting from addition of stannate to the alkaline electrolyte of batteries of this kind, and does so by providing an electrochemically active aluminum alloy anode consisting essentially of indium, at least one of manganese and magnesium, balance aluminum.

The following further references describe aluminum batteries with alkaline electrolytes, tin being present in the anode and/or in the electrolyte:

Proceedings of the 10th Scandinavian Corrosion Congress 1986, pages 355-361, K. Nisancioglu et al.

Journal of Power Sources, Vol. 22, Number 3-4, March/April 1988, pages 261-267, M. J. Niksa et al.

Proceedings of the 21st Intersociety Energy Conversion Engineering Conference, 25-29 August 1986, San Diego, Calif., Vol. 2, pages 1057-1061, A.C.S., G. M. Scamans et al.

FR No. 1473607.

Proc. Intersoc. Energy Convers. Eng. Conf. 18th Vol. 4, 1983, pages 1635-1640, D. J. Levy et al.

Extended Abstracts of the Electrochemical Society, vol. 81-2, October 1981, pages 318-319, J. Lee Morris.

U.S. Pat. No. 3,880,671.

As can be seen from the above, a great deal of work has been done on aluminum batteries with alkaline electrolytes and tin present either in the electrolyte or the anode. A commercially successful battery for high current density use has an anode based on the quaternary system Al/Mg/Sn/Ga. However, even at high current density, Ga significantly reduces the coulombic efficiency and significantly increases unwanted hydrogen gas generation.

This invention is based on the discovery that aluminum batteries with alkaline electrolytes based on the Al/Mg/Sn system in the absence of Ga, are able to achieve coulombic efficiencies above 90% over the whole range of current densities of which these batteries are capable, say 20 mA/cm$^2$ to 1000 mA/cm$^2$. The Sn may be present in the anode or in the electrolyte. To the best of applicants knowledge, aluminum batteries based on this system are (together with comparable batteries containing Ca in place of or in addition to Mg) the only ones capable of operating at high coulombic efficiencies at both high and low current densities.

In one aspect this invention provides an aluminum battery comprising a cathode, an aqueous alkaline electrolyte and an anode which is an alloy of aluminum containing 0.01-5% of magnesium and/or 0.01-0.05% calcium but no added gallium, wherein at least one of the electrolyte and the anode contains tin, any tin in the electrolyte being present as stannate at a concentration of 0.001 to 0.01M and any tin in the anode being present at a concentration of greater than 0.005%.

In other aspects, the invention provides methods of operating these batteries, which methods are defined in the claims and described hereunder.

It is generally recognised as impossible to operate aluminum alkaline batteries of this kind at high current density for extended periods of time. One reason for this is that the rapid dissolution of aluminum quickly changes the anode-cathode gap giving rise to unacceptably increasing internal resistance. Another reason is that supersaturation of the electrolyte with Al-containing species tends to passivate the anode. Such batteries can therefore be divided into two groups, those intended to be operated at high current density, and those intended to provide a stable voltage output for an extended period, such that supersaturation of the electrolyte does not limit the maximum discharge life. Different battery designs are appropriate for these different applications, whose characteristics will now be summarized.

High current density batteries are those which are operated at a current density of at least 400 mA/cm$^2$, and up to 800 or even 1000 mA/cm$^2$ or more. The voltage obtainable is less than would be the case at lower current densities, so the coulombic efficiency is higher and the tendency to generate hydrogen gas is lower. Aluminum dissolved from the anode during discharge builds up in the electrolyte and quickly reaches super saturated levels; since batteries of this kind generally cannot survive the point of maximum supersaturation of the electrolyte, their service life is limited (unless sophisticated electrolyte control means are used).

Batteries designed to operate for longer than this are run at lower current densities, typically below 400 mA/cm$^2$, although short bursts at higher current density might be required. Under these conditions, the anode potential is more negative so the coulombic efficiency tends to be lower. Hydrogen gas generation can be a problem, not only because of the explosion hazard, but also because the gas entrains alkaline electrolyte to form a corrosive mist. The batteries generally need to operate beyond the point at which aluminum hydroxide precipitates out in the electrolyte, and precautions need to be taken to minimize the risk of anode passivation at this time. The anode needs to be large, so as to ensure that enough aluminum metal is available to run the battery for the desired extended period.

Because of the unique characteristics of the Al/Mg/Sn and Al/Ca/Sn systems outlined above, this invention is concerned with both categories of battery. However, an important aspect of the invention is concerned with the latter category, batteries designed to provide a stable voltage output for an extended period, which we have designated high amp-hour batteries. This phrase indicates a battery designed to provide a stable voltage output for at least one hour when operated at a relatively low current density, for example of from 5 to 400 mA/cm$^2$. Preferably, the battery is designed to provide a stable voltage output for at least 24 hours when operated under these circumstances. Such batteries are likely to be operated at current densities in the range 20 to 250 mA/cm$^2$. For example, they may be provided as reserve batteries, for use in the event of power failure, in which circumstance currents may be drawn at densities of typically 20 to 150 mA/cm$^2$. The volume (and the cost) of conventional lead acid batteries designed to do the same job would be about twelve times as great as of an akaline aluminum battery. Another example is for use to provide traction in electrically powered vehicles, where current is likely to be drawn at an average density typically in the range 100 to 250 mA/cm$^2$, although higher current might be drawn for short bursts. Where this is required, tin should be present in the anode in concentrations greater than 0.005%.

This invention results from the discovery, which was unexpected in the light of the teachings of the aforesaid references, that combinations of magnesium (and/or calcium) with tin can be used to make aluminum batteries which operate at very low hydrogen emission (i.e. at very high coulombic efficiency), even at low current densities. It appears that this effect results from some kind of synergy between Mg and Sn. The tin may be present in the anode (in solid solution with the magnesium) or in the electrolyte (as stannate), or in both the anode and the electrolyte.

In this system, the tin is acting as an activator for the aluminum. That is to say, the tin is increasing the negative potential of the anode. This activation involves development of a tin-rich layer on the surface of the anode when current is drawn from the battery. The term "tin-rich layer" is here used in a macroscopic sense. The tin may be present at the anode surface, either as a continuous or discontinuous layer or as discrete globules or particles. This tin-rich layer is readily detected, by means of a scanning electron microscope using backscattered imaging and identified using X-ray analysis in the same microscope.

Previous research has relied upon the addition of stannate to alkaline electrolytes in order to control the parasitic corrosion occurring at aluminum anodes. We have unexpectedly discovered that tin in this form can act as an activator for an aluminum anode, and that as a consequence, discharging the battery leaves a tin-rich layer on the surface of the anode. For this purpose, tin is preferably present in the electrolyte at a concentration of from 0.001 to 0.01M. If the stannate concentration is too low, the anode may tend to hyperactivate. In the hyperactive state the corrosion of the anode and evolution of hydrogen is even more rapid than when there is no stannate present at all. If the stannate concentration is too high, tin progressively plates out on the anode and may give rise to dendritic growths which can short circuit the battery or can damage the elecrolyte circulation system. We have found that tin in the electrolyte acts with magnesium in the anode to reduce hyperactivation, so that low stannate concentrations are useful. Some of the references noted above used stannate in the electrolyte, but at higher concentrations, presumably to overcome the problem of hyperactivation in the absence of magnesium. Whatever may be the position in test cells in the laboratory, high stannate concentrations are impracticable in batteries for commercial use.

However in certain applications there are problems involved in including stannate in the electrolyte, and as a result we may provide tin in the anode in the form of an alloy with aluminum. It is however important that at least some, and preferably all, of the tin be present in solid solution in the aluminum. Tin in precipitate form is not effective as an activator, and may indeed be harmful by constituting corrosion sites. To achieve a significant activating effect, the tin concentration in solid solution in the alloy should be greater than 0.005%, preferably 0.01% to 0.20%. It is difficult to achieve dissolved tin contents above about 0.12%. Tin may be present in precipitate form, as well as in solution, but for the reasons given above this is not preferred. To bring the tin into the required state, the alloy is preferably solution heat treated at a temperature above 500° C. followed by quenching at a sufficient rate to suppress Sn precipitation.

In deciding whether to include Sn in the anode and/or stannate in the electrolyte, various factors need to be considered. During operation of the battery the Al concentration of the electrolyte increases. In some systems a crystalliser is used to keep Al concentration down, and in these stannate is preferably absent from the electrolyte. On the other hand, in systems which do not employ a crystalliser, stannate in the electrolyte may be advantageous. Al Mg alloys are somewhat easier to cast and fabricate than are Al Mg Sn alloys. If tin is present in the anode the battery may "switch on" quickly (i.e. rapidly activate to maximum voltage under conditions of high current discharge), although this is unlikely to be important in practice. Batteries with Al Mg Sn anodes, and batteries with Al Mg anodes plus stannate, operate at about the same maximum coulombic efficiencies, but the former batteries maintain that efficiency over a wider range of current densities and are accordingly preferred.

Choosing a grade of aluminum for the anode is a matter of balancing properties against cost. Purer aluminum is less subject to parasitic corrosion, and our experimental work has mostly used 99.999% Al. But pure aluminum is expensive, and there are commerical pressures to use 99.99% Al or even commerical grade Al of 99.85% purity. Impurities increase corrosion, but it appears that this can to some extent be controlled by including Mg in the alloy, as more fully described below, so as to permit the use of lower grade or even commercial grade Al.

The anode may contain Mg, either instead of or together with Sn, preferably at a concentration of from 0.05 to 5.0%, particularly from 0.01 to 1.8%. Mg helps to improve the impurity tolerance of the alloy, and refines the grain size of the cast alloy. The presence of Mg in the anode, both without tin and more particularly together with tin, suppresses hydrogen evolution and improves the coulombic efficiency of the battery.

The anode may contain Ca, preferably at a concentration of 0.01 to 0.05% by weight. Ca helps to reduce the tendency of anodes to hyperactivate, and helps to show better voltage recovery after aluminum hydroxide precipitation.

The anode may also contain boron, preferably at a concentration of 0.01 to 0.05% by weight. Boron when added with calcium as a grain refiner has been found to make casting of the anode easier, without the concomitant disadvantage (which titanium diboride possesses) of tending to passivate the anode.

The anode optionally contains indium, particularly at a concentration of 0.01–0.20%. Indium has the effect of reducing the tendency of the anode to hyperactivate.

It is a feature of the invention that Ga and Mn are not deliberately added, either to the anode or in the electrolyte. Gallium is conventionally used in the anode because it permits operation at high voltage and high power density. However, in the presence of gallium, parasitic corrosion of the anode and evolution of hydrogen cannot, at high current densities and more particularly at low current densities, be avoided. In the presence of tin, manganese tends to cause passivation.

When the electrolyte contains dissolved tin, e.g. in the form of stannate, the addition of indium, e.g. as the chloride, may be useful in reducing the tendency of the system to hyperactivate. The low solubility of indium in alkaline electrolytes generally limits its concentration to not greater than about 0.001M.

The nature of the cathode is not critical. An air cathode or a silver oxide cathode is preferred.

The alkaline electrolyte should have a pH of at least 10, preferably at least 12, and may comprise a 10–50% solution of NaOH, KOH or LiOH. The electrolyte may also contain NaCl, as in the case when the battery is activated by seawater. Preferred electrolytes are 4M NaOH and 7M KOH. Other electrolytes may be made up from KOH or NaOH dissolved in fresh water or sea water.

Electrolyte management is a problem for all Al batteries. The useful lifetime of the battery system is generally limited by the electrolyte capacity rather than exhaustion of the anode or breakdown of the air cathode. As Al is dissolved during discharge, it forms complex ions which eventually preciptate as either Al (OH)$_3$ (hydrargillite) or (in saline electrolytes) Al OOH (pseudoboehmite). It is this aluminum hydroxide preciptation which has to be managed in order to extend electrolyte capacity (battery lifetime) and to make cells cleanable and reusable. Known ways of improving electrolyte capacity include stirring, flowing or reciprocating the electrolyte over the anode, rather than letting it remain stagnant.

This invention also provides a method of operating a battery as defined by drawing current from the battery whereby aluminum of the anode progressively dissolves in the electrolyte, which method comprises introducing seed crystals into the electrolyte to aid precipitation of aluminum values (i.e. generally aluminum hydroxide Al(OH)$_3$) from the electrolyte.

When the seed crystals are introduced into the electrolyte, the dissolved alumina is encouraged to precipitate on them. The result is a coarser precipitate which is more easily filtered or caused to sediment out of solution. Also, the seed crystals reduce the maximum supersaturation of Al-containing species in the electrolyte and so reduce variations in conductivity. The nature of the seed is not critical provided the alumina values precipitate on it; generally alumina trihydrate seed is preferred. The seed material preferably has very small particle sizes, e.g. less than 1 micron. The amount of seed used determines how quickly the aluminum values are brought out of solution, which in turn affects the power density available from the battery. The seed may be added at the outset, but is preferably added when the alumina concentration of the electrolyte has built up towards saturation, or even when the electrolyte is already super-saturated.

Although the alloys described above have rather good resistance to parasitic corrosion under open circuit, it is normally necessary to remove electrolyte from contact with the anode at times when current is not being drawn from the battery. Techniques for this and other aspects of electrolyte management are known, see for example G. Scamans Chemistry and Industry, 17 Mar. 1986 pages 192 to 196.

It is possible, but generally impractical with high amp-hour batteries, to provide such a large volume of electrolyte that all the aluminum hydroxide remains in solution. More usually, the electrolyte volume is restricted, with the result that the aluminum hydroxide concentration progressively rises to super saturated levels and finally precipitates out, typically after 5 to 10 hours of operation. This precipitation point is always marked by a temporary decrease in the cell voltage (at constant current density). Although there is no reason in principle why the battery should not continue to discharge with precipitated aluminum hydroxide circulating in the electrolyte, in practice many anodes become passivated at this point in a phenomenon which has been called aluminum hydroxide induced passivation (AHIP). Under the conditions of this invention, AHIP does not occur, and after a temporary dip, the voltage obtained on discharge reverts to something approaching its original level.

Reference is directed to the accompanying drawing which is a graph of corrosion current against anodic current density for various battery systems. All results were generated using a 5M KOH electrolyte at 60° C. All results below 100 mA/cm$^2$ anodic current density were measured after high amp-hour testing in a flowing cell. All results above 100 mA/cm$^2$ were generated using 1 cm$^2$ specimens in a galvano static weight loss technique. 1 m/A/cm$^2$ of corrosion current is equivalent to 0.007 cm$^2$/cm$^2$/min of hydrogen evolution. The four lines marked A, B, C and D were obtained using different systems as follows.

Line A was derived by use of an Al anode containing 0.7% Mg, 0.09% Sn and 0.03% Ga. The corrosion current was above 20 mA/cm² at all levels of anodic current density. Parasitic corrosion of the anode and evolution of hydrogen cannot be avoided when gallium is present in the anode.

Line B was obtained using an Al anode containing 0.089% Sn. The corrosion current was in the range 12 to 30 mA/cm² over a wide range of anodic current densities. Batteries containing Sn without Mg are not less capable of operating at high coulombic efficiencies.

Line C was obtained using an Al anode containing 0.5% Mg plus 0.07% Sn. This ternary alloy maintains greater than 90% efficiencies from as low as 17 mA/cm² up to more than 1 A/cm² (from about 75 mA/cm² the efficiency figure is 98 to 99%).

Curve D was obtained using an Al anode containing 0.5% Mg. In this case, the 5M KOH electrolyte contained 0.004M sodium stannate. At anodic current densities from about 60 to about 150 mA/cm², this system is a viable alternative to the ternary alloy of line c. Below about 60 mA/cm², coulombic efficiency is progressively reduced. Above about 150 mA/cm², the voltage output from the cell drops. It is possible to raise this upper limit by increasing the stannate concentration of the electrolyte, but this progressively gives rise to other problems as noted above.

Experimental I

Various alloys were compared to 99.999% Al. Alloys were cast, either as book moulds on 99.999% Al or 99.995% Al base or as extrusion ingots and processed to 8 mm rod. In all cases, the book moulds or the extrusions were heat treated for one hour at 600° C., cold water quenched and then cold rolled to 3 mm.

A restricted volume of electrolyte (100 ml) was used to deliberately cause progressive supersaturation of the electrolyte with Al(OH)$_4^-$ aluminate ions as the anode dissolved. One gram of gibbsite (from earlier tests) was added to the electrolyte in each case after about 6 hours operation as a seeding agent.

The data in the following Examples 1 to 6 was obtained using a reserve battery simulator. These were constant resistance experiments in which current was drawn steadily at a rate of 60 to 80 mA/cm². In all cases (unless previously terminated) aluminum hydroxide precipitation took place in the electrolyte after 6 to 9 hours operation. In all cases the electrolyte was 5M KOH (with or without additions) and operation was at about 60° C. Examples 1, 2 and 6 are not in accordance with the invention and are included for purposes of comparision.

EXAMPLE 1

| Anode | Al + 0.04% Ga + 0.6% Mg |
|---|---|
| Electrolyte additive | 0.004 M Na$_2$SnO$_3$ |

The battery operated initially at about 35% efficiency with high anode corrosion, and failed after 2.5 hours due to disintegration of the anode. This experiment shows that anodes containing gallium are unsatisfactory.

EXAMPLE 2

| Anode | Al + 0.09% Sn |
|---|---|
| Electrolyte additive | 0.004 M Na$_2$SnO$_3$ |

The battery showed stable operation for more than 10 hours. The voltage was about 1.5 V, falling to about 1.4 V after the aluminum hydroxide precipitation. The average coulombic efficiency over the first 10 hours of operation was about 87%, less good than is achieved in the presence of Mg.

EXAMPLE 3

| Anode | Al + 0.2% Mg |
|---|---|
| Electrolyte additive | 0.004 M Na$_2$SnO$_3$ |

The battery showed stable operation for more than 10 hours. The voltage was about 1.5 V, falling to about 1.4 V after the aluminum hydroxide precipitation. The average coulombic efficiency over the first 10 hours of operation was about 95%.

EXAMPLE 4

| Anode | Al + 0.09% Sn + 0.9% Mg |
|---|---|
| Electrolyte additive | Nil |

The battery showed stable operation for more than 10 hours. The voltage was about 1.5 V, falling to about 1.4 V after the aluminum hydroxide precipitation. The average coulombic efficiency over the first 10 hours of operation was about 98%.

EXAMPLE 5

| Anode | Al + 0.77% Mg + 0.04% In |
|---|---|
| Electrolyte additive | 0.004 M Na$_2$SnO$_3$ |

The battery showed stable operation for more than 9 hours. The voltage was about 1.5 V falling to about 1.4 V after Al(OH)$_3$ precipitation. (Minimum voltage was 1.37 V at the point of maximum electrolyte supersaturation). The average coulombic efficiency over the first ten hour discharge period was 99.1%.

EXAMPLE 6

| Anode | 99.999% Al |
|---|---|
| Electrolyte additive | 0.06 M Na$_2$SnO$_3$ |

The battery showed stable operation for about 5 hours followed by a period of increasing instability in both the current and voltage outputs. The average voltage and current slowly declined during this period and after about 8 hours electrolyte could no longer be flowed through the cell because of clogging caused by tin dendrite growth on the anode. Average efficiency was very difficult to measure, but was about 80% (±5%). This experiment shows that the use of stannate above 0.01M in the electrolyte is unsatisfactory.

Examples 7 to 9 show batteries operated at high current density. Examples 7 and 8 are not in accordance with the invention and are included for purpose of comparison with Example 9.

EXAMPLE 7

| Alloy | Pure Al (99.999%) |
|---|---|
| Electrolyte | 25% KOH, 3.5% NaCl at ~80° C. |
| Current Density | ~520 mA/cm² |

-continued

| | |
|---|---|
| Anode Potential | ~ −1.22 V (vs Hg/HgO) |
| Discharge Period | ~10 minutes |
| Coulombic Efficiency | ~96% |

EXAMPLE 8

| | |
|---|---|
| Alloy | Al +0.7 Mg + 0.09 Sn + 0.026 Ga (99.995 Al BASE) |
| Electrolyte | 25% KOH + 3.5% NaCl at ~80° C. |
| Current Density | ~715 mA/cm$^2$ |
| Anode Potential | ~ −1.62 V (vs Hg/HgO) |
| Discharge Period | ~10 minutes |
| Coulombic Efficiency | ~97% |

EXAMPLE 9

| | |
|---|---|
| Alloy | Al + 0.45 Mg + 0.085 Sn (99.995% BASE) |
| Electrolyte | 25% KOH + 3.5% NaCl at ~80° C. |
| Current Density | ~645 mA/cm$^2$ |
| Anode Potential | ~ −1.52 V |
| Discharge Period | ~10 minutes |
| Coulombic Efficiency | ≧99% |

Example 7 shows how poor pure Al is compared with superactive alloys. A comparison of examples 8 and 9 indicates that a small Ga content will significantly increase the available power at the expense of ~2% efficiency. However, this represents at least a 4-fold increase in H$_2$ generation and the Al/Mg/Sn/Ga system becomes progressively less efficient at lower current densities. The Al/Mg/Sn alloys are the only superactive alloys so far identified which will maintain % efficiencies in the high 90's across the whole spectrum of current density.

Examples 10 to 13 show operation of batteries at low currenty densities. Example 13 is not in accordance with the invention and is included for comparison with numbers 10 to 12.

The following results were generated on the same reserve battery simulator system over periods of ≧10 hours, i.e. they are all high amp hour results, obtained at low current densities.

The four alloy variants were made on ≧99.995% Al base.

In each test tin was the single superactivating element and since Mg has no effect upon voltage, all the alloys exhibited the same voltage at a given current density. At 75 mA/cm$^2$ this was ~ −1.73 V (vs Hg/HgO) and ~1.45 V cell voltage with an air electrode.

| EXAMPLE | ALLOY | ELECTROLYTE |
|---|---|---|
| 10 | 0.5 Mg + 0.07 Sn | 5 M KOH, 60° C. |
| 11 | 0.5 Mg + 0.14 Sn | 5 M KOH, 60° C. |
| 12 | 0.5 Mg | 5 M KOH, 60° C. + 0.004 M Stannate |
| 13 | 0.09 Sn | 5 M KOH, 60° C. |

| | COULOMBIC EFFICIENCY CURRENT DENSITY/CELL VOLTAGE | | | |
|---|---|---|---|---|
| EXAMPLE | 75/1.45 | 36/1.60 | 17/1.66 | 11/1.68 |
| 10 | 98–99 | 96 | 93 | 63 |
| 11 | 96 | 94 | 66 | — |
| 12 | 98–99 | 84 | 63 | — |
| 13 | 85 | — | 37 | — |

These results show that the combination of Mg and Sn maintains high coulombic efficiency without any voltage penalty as compared with the Mg free systems.

EXAMPLE 14

This example shows the use of a battery based on the Al/Ca/Sn system.

| | |
|---|---|
| Alloy | 0.17% Ca (99.999% Al BASE) |
| Electrolyte | 5 M KOH +0.004 M Na$_2$ SnO$_3$ ~60° C. |
| Test | ~8 hours discharge at −80 mA/cm$^2$ in the TCR simulator cell (i.e. high amphour) |
| Efficiency | ~78% |
| Voltage | ~1.5 V |

Although the efficiency was lower than Mg+Sn the anode showed excellent voltage recovery and did not exhibit a protracted hyperactive period at the start of discharge.

We claim:

1. An aluminum battery comprising a cathode, an aqueous alkaline electrolyte and an anode which is an alloy of aluminum containing 0.01–5% of magnesium and/or 0.01–0.05% calcium but no added gallium, wherein at least one of the electrolyte and the anode contains tin, any tin in the electrolyte being present as stannate at a concentration of 0.001 to 0.01M and any tin in the anode being present at a concentration of greater than 0.005%.

2. A battery as claimed in claim 1 designed to provide a stable voltage output for at least 1 hour at a current density of 5–400 mA/cm$^2$.

3. A battery as claimed in claim 2 designed to operate at a current density of 25–250 mA/cm$^2$.

4. A battery as claimed in claim 1, wherein the anode contains 0.01–0.2% tin.

5. A battery as claimed in claim 1, wherein the anode contains 0.01–0.20% indium.

6. A battery as claimed in claim 1, wherein the anode consists of one or both of 0.01–0.2% tin and 0.01–5% magnesium, optionally together with 0.01–0.05% calcium and optionally together with 0.01–0.20% indium, balance aluminum of at least 99.85% purity.

7. A method of operating an aluminum battery comprising a cathode, an aqueous alkaline electrolyte and an anode which is an alloy of aluminum containing 0.01–5% of magnesium and/or 0.01–0.05% calcium but no added gallium, wherein at least one of the electrolyte and the anode contains tin, any tin in the electrolyte being present as stannate at a concentration of 0.001 to 0.01M and any tin in the anode being present at a concentration of greater than 0.005%, which comprises drawing current from the battery at an average current density of 5–400 mA/cm$^2$ of anode surface for at least one hour.

8. A method as claimed in claim 7, wherein current continues to be drawn from the battery during and after a period in which the concentration of aluminum hydroxide in the electrolyte increases until an aluminum hydroxide precipitate is formed in the electrolyte.

9. A method of operating an aluminum battery comprising a cathode, an aqueous alkaline electrolyte and an anode which is an alloy of aluminum containing 0.01–5% of magnesium and/or 0.01–0.05% calcium but no added gallium, wherein at least one of the electrolyte and the anode contains tin, any tin in the electrolyte being present as stannate at a concentration of 0.001 to 0.01M and any tin in the anode being present at a concentration of greater than 0.005% by drawing current from the battery whereby aluminum of the anode progressively dissolves in the electrolyte, which method comprises introducing seed crystals into the electrolyte to aid precipitation of aluminum values from the electrolyte.

10. A method as claimed in claim 9, wherein the seed crystals are of alumina trihydrate.

* * * * *